(12) United States Patent
Benel

(10) Patent No.: US 9,841,283 B2
(45) Date of Patent: Dec. 12, 2017

(54) PATH GUIDANCE SYSTEM FOR THE VISUALLY IMPAIRED

(71) Applicant: Gabriel Oren Benel, Aspen, CO (US)

(72) Inventor: Gabriel Oren Benel, Aspen, CO (US)

( * ) Notice: Subject to any disclaimer, the term of this patent is extended or adjusted under 35 U.S.C. 154(b) by 0 days.

(21) Appl. No.: 15/635,816

(22) Filed: Jun. 28, 2017

(65) Prior Publication Data
US 2017/0307381 A1 Oct. 26, 2017

Related U.S. Application Data

(62) Division of application No. 14/820,463, filed on Aug. 6, 2015, now Pat. No. 9,726,501.

(51) Int. Cl.
| | |
|---|---|
| G01C 21/20 | (2006.01) |
| G01S 19/51 | (2010.01) |
| G01S 19/49 | (2010.01) |
| G01S 19/43 | (2010.01) |
| G01S 19/14 | (2010.01) |
| G01S 19/05 | (2010.01) |
| G01S 19/42 | (2010.01) |
| G01C 21/16 | (2006.01) |
| G01S 19/19 | (2010.01) |

(52) U.S. Cl.
CPC .......... *G01C 21/20* (2013.01); *G01C 21/165* (2013.01); *G01C 21/206* (2013.01); *G01S 19/05* (2013.01); *G01S 19/14* (2013.01); *G01S 19/19* (2013.01); *G01S 19/42* (2013.01); *G01S 19/43* (2013.01); *G01S 19/49* (2013.01); *G01S 19/51* (2013.01)

(58) Field of Classification Search
CPC .... G01C 21/20; G01C 21/165; G01C 21/206; G01S 19/05; G01S 19/14; G01S 19/19; G01S 19/42; G01S 19/43; G01S 19/49; G01S 19/51
See application file for complete search history.

(56) References Cited

U.S. PATENT DOCUMENTS

| | | | | |
|---|---|---|---|---|
| 4,853,839 A | * | 8/1989 | Nichols | ........... G01S 13/723 341/116 |
| 7,022,131 B1 | * | 4/2006 | Derowe | ........... A61B 17/0057 606/153 |
| 8,185,101 B1 | * | 5/2012 | Wiseman | ........... G01S 5/0027 340/539.13 |
| 9,478,147 B2 | * | 10/2016 | Gifford | ........... G09B 19/00 |
| 9,517,175 B1 | * | 12/2016 | Sisbot | ........... G06K 9/00335 |
| 2007/0293149 A1 | * | 12/2007 | Wubker | ........... H04B 1/3805 455/13.2 |
| 2008/0059059 A1 | * | 3/2008 | Cohen | ........... G01C 21/206 701/408 |

(Continued)

*Primary Examiner* — Calvin Cheung
(74) *Attorney, Agent, or Firm* — Robert D. Eisler

(57) ABSTRACT

An innovative path guidance system and method has been invented that in a preferred embodiment allows visually impaired people to follow a dynamically changing path that avoids obstacles and arrive at a destination with minimal intervention by a sighted guide. The disclosed invention has the leader set a track electronically, and employs but is not limited to haptic feedback and audible alerts used in combination or individually, to help the visually impaired person control his or her trajectory. The visually impaired follower can be following a leader setting the path in real time or following a path established by a guide at an earlier time and recorded.

14 Claims, 14 Drawing Sheets

(56) References Cited

U.S. PATENT DOCUMENTS

| | | | | |
|---|---|---|---|---|
| 2010/0256902 A1* | 10/2010 | Coch | .................. | G09B 29/10 |
| | | | | 701/431 |
| 2011/0169633 A1* | 7/2011 | Lauder | .................. | G01S 5/18 |
| | | | | 340/539.13 |
| 2011/0172850 A1* | 7/2011 | Paz-Meidan | .............. | B25J 5/00 |
| | | | | 701/2 |
| 2012/0086606 A1* | 4/2012 | Mathews | ............. | G01C 21/165 |
| | | | | 342/461 |
| 2012/0171644 A1* | 7/2012 | Moser | ................. | F41J 9/02 |
| | | | | 434/16 |
| 2012/0209504 A1* | 8/2012 | Loftus | ................ | G01C 21/20 |
| | | | | 701/409 |
| 2013/0016879 A1* | 1/2013 | Baele | ................ | G06K 9/00201 |
| | | | | 382/103 |
| 2013/0082828 A1* | 4/2013 | Furey | ................ | G08B 1/08 |
| | | | | 340/286.01 |
| 2013/0166198 A1* | 6/2013 | Funk | .................. | G01C 21/165 |
| | | | | 701/446 |
| 2014/0100771 A1* | 4/2014 | Ekpar | ................ | B60W 30/165 |
| | | | | 701/408 |
| 2014/0342753 A1* | 11/2014 | DeMerchant | ........... | H04W 4/02 |
| | | | | 455/456.2 |
| 2015/0192420 A1* | 7/2015 | Watters | .............. | G01C 21/3407 |
| | | | | 701/410 |
| 2016/0059881 A1* | 3/2016 | Hornberger | ............ | B62D 1/283 |
| | | | | 701/24 |
| 2016/0223340 A1* | 8/2016 | Shin | ................... | G01C 21/206 |
| 2016/0267755 A1* | 9/2016 | Martinson | ................ | G08B 6/00 |
| 2016/0335917 A1* | 11/2016 | Lydecker | ............ | G09B 21/008 |
| 2017/0006428 A1* | 1/2017 | Dow | | |

\* cited by examiner

PATH GUIDANCE SYSTEM FOR THE VISUALLY IMPAIRED

RELATED APPLICATIONS

The current application is a division of U.S. Non-Provisional application Ser. No. 14/820,463 filed 8 Aug. 2015. U.S. Non-Provisional application Ser. No. 14/820,463 is incorporated by reference in its entirety.

COPYRIGHT & TRADEMARK NOTICE

A portion of the disclosure of this patent document contains material, which is subject to copyright protection. The owner has no objection to the facsimile reproduction by anyone of the patent document or the patent disclosure, as it appears in the Patent and Trademark Office patent files or records, but otherwise reserves all copyrights whatsoever.

Certain marks referenced herein may be common law or registered trademarks of third parties affiliated or unaffiliated with the applicant or the assignee. Use of these marks is by way of example and shall not be construed as descriptive or to limit the scope of this invention to material associated only with such marks.

TECHNICAL FIELD OF THE INVENTION

The present invention relates to an innovative path guidance system and associated method to guide visually impaired people along a path that avoids obstacles and arrive at a destination with minimal or no intervention by a sighted guide.

BACKGROUND OF THE INVENTION

Prior guidance methods for leader/follower systems using simple voice communication over radio or Bluetooth systems limit the quantity and level of detail that can be employed by the users. The time needed by a leader who functions as a guide for a follower individual or group of people, to describe geographic features, obstacles, hazards, and desired actions to a follower or followers is long and compromises the ability of followers to react and effect collision avoidance maneuvers or simply follow specified paths that are dynamically changing. Without visual confirmation, the leader also cannot discern if followers are aligned with specified paths. These issues are particularly acute for Visually Impaired (VI) participants in recreational and competitive athletic events.

A new path guidance system has been invented that incorporates a virtual path created by the leader and detected by the follower(s). An algorithm:
1. Computes the followers deviation from the path;
2. Alerts the follower via multiple forms of feedback to direct the follower back to the desired path;
3. Alerts the leader of the follower(s) deviation from the path; and,
4. Gives the follower predictive information of upcoming path changes and their intensity.

Prior art has used GPS, Inertial Measurement Units (IMUs), ultrasound and other tracking methods in leader/follower systems.

Hogg, et. al. (2001) uses GPS and Inertial Measurements to create a path following system for pack robots to follow a leader. The path of the leader is recorded and then downloaded to the following robots. The path following algorithm uses a "carrot following" approach to command the following robot to a path sub goal.

The present invention differs in that it transmits the leader's data to the follower in "real time" or near real-time. Additionally, the present invention uses two way communications to alert the leader to the follower's deviation from a path. The follower also gets information on upcoming path changes of the leader and the intensity of those upcoming changes to prepare for future movements.

Cosgun (2014) presents a navigation system that guides a human with a visual impairment to an object using haptic feedback in the form of a vibrating belt. The present invention differs in that it provides real time guidance to follow a path that can be dynamically changing, not guidance to a stationary object as in Cosgun (2014). Also, in the present invention, it can be important for a follower path to be in alignment with different portions of a leader path history.

Henze (2006) investigates different forms of haptic feedback to aid in guidance of pedestrians with a visual impairment. That system however is not intended for precise path following as is the current invention.

SUMMARY OF THE INVENTION

An innovative path guidance system and associated methods have been invented that differs significantly from prior art path guidance systems that use a leader/follower system. Prior art leader/follower path guidance systems ensuring accurate path alignment between a leader and follower path, especially where follower paths are dynamically changing, have historically focused on one way communication between the leader steering a follower using voice commands or visual cues along path coordinates, or the follower tracking closely behind the leader.

The new path guidance system and associated methods of use (henceforth referred to as "the invention") incorporates a position guidance device or devices, leader and follower feedback devices, algorithms embedded in a microcontroller or controllers that compute deviations of the follower from a prescribed track and alerts the follower of deviations from the track via different sensory modalities including but not limited to haptics feedback, auditory cues, and/or visual cues used individually or in combination.

One embodiment of the invention includes a lead unit that sets a three dimensional virtual track in space and communicates with a second unit so that the second unit can detect that track. An algorithm computes the deviations of the follower from that track and alerts the follower via different feedback mechanisms. The follower unit also communicates with the lead unit to enable the leader to be alerted to the follower's deviation from the track.

Feedback mechanisms include but are not limited to haptic feedback, audio alerts, or visual cues used individually or in combination to enable users to employ the data and feedback to alter trajectory and plan future course changes. Alternate modes of operation include a lead unit designating and saving a track for later use by a follower. The follower can then proceed to a location and choose from a set of tracks to follow.

The system developed is a high speed, highly accurate position (order of centimeters) guidance and feedback device enabled with user controlled parameters. The system unit can be highly portable, wearable and rugged. It can be battery powered, and a rechargeable system that complies, for example, with the rules and regulations for various competitive sporting events set by the respective governing bodies.

A preferred embodiment of this invention is for use by Visually Impaired (VI) participants in recreational and competitive sporting events. Typically, path guidance to VI participants in recreational and sporting events is provided by a sighted guide or leader that provides path guidance using voice audible signals or communication devices such as Bluetooth headsets to a VI follower. These leader/follower systems focus on one way communication between the leader and follower for the path coordinates, or the follower tracking closely behind the leader. The need for the leader to observe the follower and communicate path changes has considerable latency in effecting path changes by the follower and imposes a significant cognitive load constraining task performance by the follower and imposing increased collision and path misalignment risks, especially for VI athletic participants.

The preferred embodiment does not require or only minimally requires a sighted guide's intervention for path guidance of a VI participant and remedies the shortcomings for VI participants. These remedies are at least threefold.

1. Reduced cognitive load—In this embodiment, the follower receives information from the leader and interprets it using various algorithms to compute current deviation from the desired path, as well as information regarding direction and intensity of upcoming events such as follower course changes, hazards and collision avoidance. The intuitive user interface gives the user an easy way to process this information and lets the follower user control his or her actions more independently with a reduced cognitive load that might be associated with other communication methods such as voice. This results in an overall reduction of the cognitive load on the user by lessening the amount of cognitive processing required by the user. It is also safer in that the user gets more information on direction changes and can react more quickly to hazards and collision avoidance.

2. Reduced latency in effecting path changes—Latency for voice guidance by a leader/follower is long compared to latency achieved in the current embodiment for VI followers that employs a system of tactile or audible alerts where vocal instruction does not have to be transmitted, interpreted, and organized to achieve a follower responding reaction. Also, the path created by the leader with this system can be saved so that the follower does not need to be directly behind the leader. The coordinates of the path can also be saved so that the follower can detect the path even when the leader is not present.

3. Two-way information transfer—While the follower gets path data from the leader, the leader can also receive information from the follower's unit as to how successfully the follower is on the desired path. This lets the leader make necessary adjustments and reduces the need for the leader to be constantly visually checking the status of the follower.

DETAILED DESCRIPTION OF THE DRAWINGS

Figure 1:
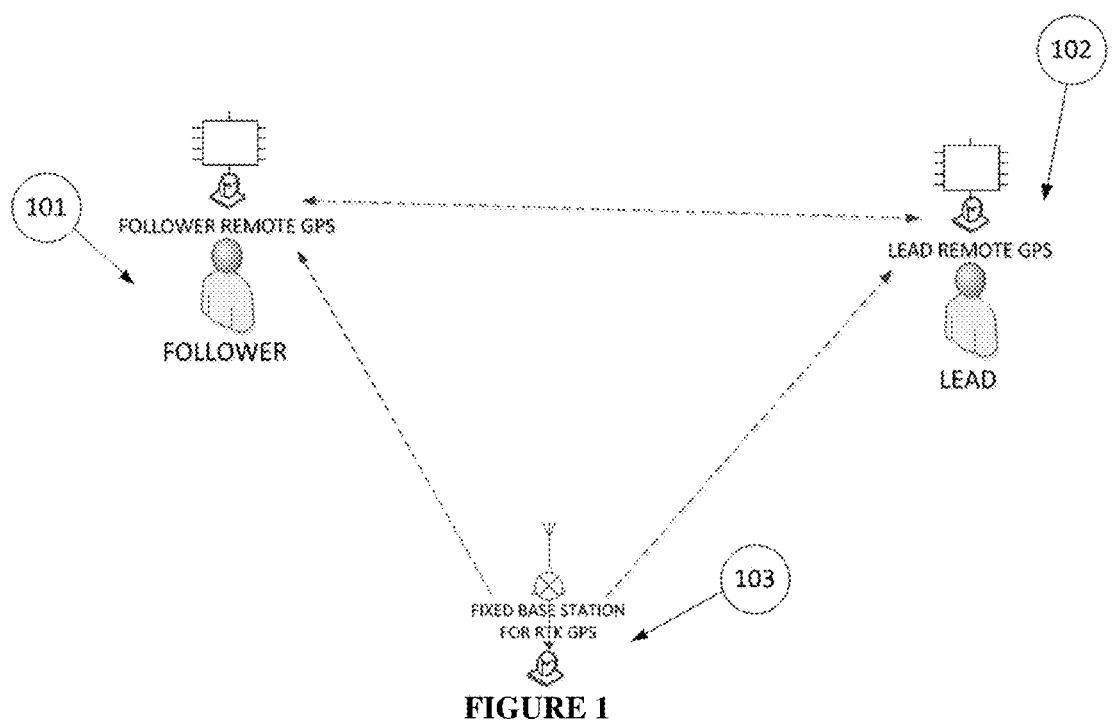
FIG. 1 shows a system overview using Real Time Kinematic (RTK) satellite navigation employing the Global Positioning System (GPS) for positioning.

FIG. 1 shows a system overview using Real Time Kinematic (RTK) satellite navigation employing the Global Positioning System (GPS) for positioning. The leader's and follower's absolute positions are computed on the order of centimeters using three Real-Time Kinematics (RTK) Global Positioning System (GPS) units, one of which is a fixed base station.

The follower can thus compute deviations from the leader's track at any point, not just the leader's instantaneous position. Microcontrollers at each position communicate with the GPS units, perform calculations and command outputs. The three units communicate with one another using radio hardware capable of spanning distances of up to 20 km. Detail 101 in FIG. 1 shows the follower unit that performs the following actions:

RECEIVES GPS data from BASE STATION and computes RTK position

RECEIVES GPS data from LEAD and computes difference in position at current location RECEIVES GPS data from LEAD to see what moves LEAD is currently making ACTUATES tactile feedback SENDS position to LEAD Detail 102 in FIG. 1 shows the lead unit that:

RECEIVES data from BASE STATION and computes RTK position

SENDS position information to FOLLOWER

RECEIVES position from FOLLOWER, computes FOLLOWER'S deviation from path and FOLLOWER'S distance from LEAD ACTUATES tactile feedback Detail 103 in FIG. 1 shows the base station that sends GPS data to the follower and leader so that absolute positions can be obtained.

Figure 2:
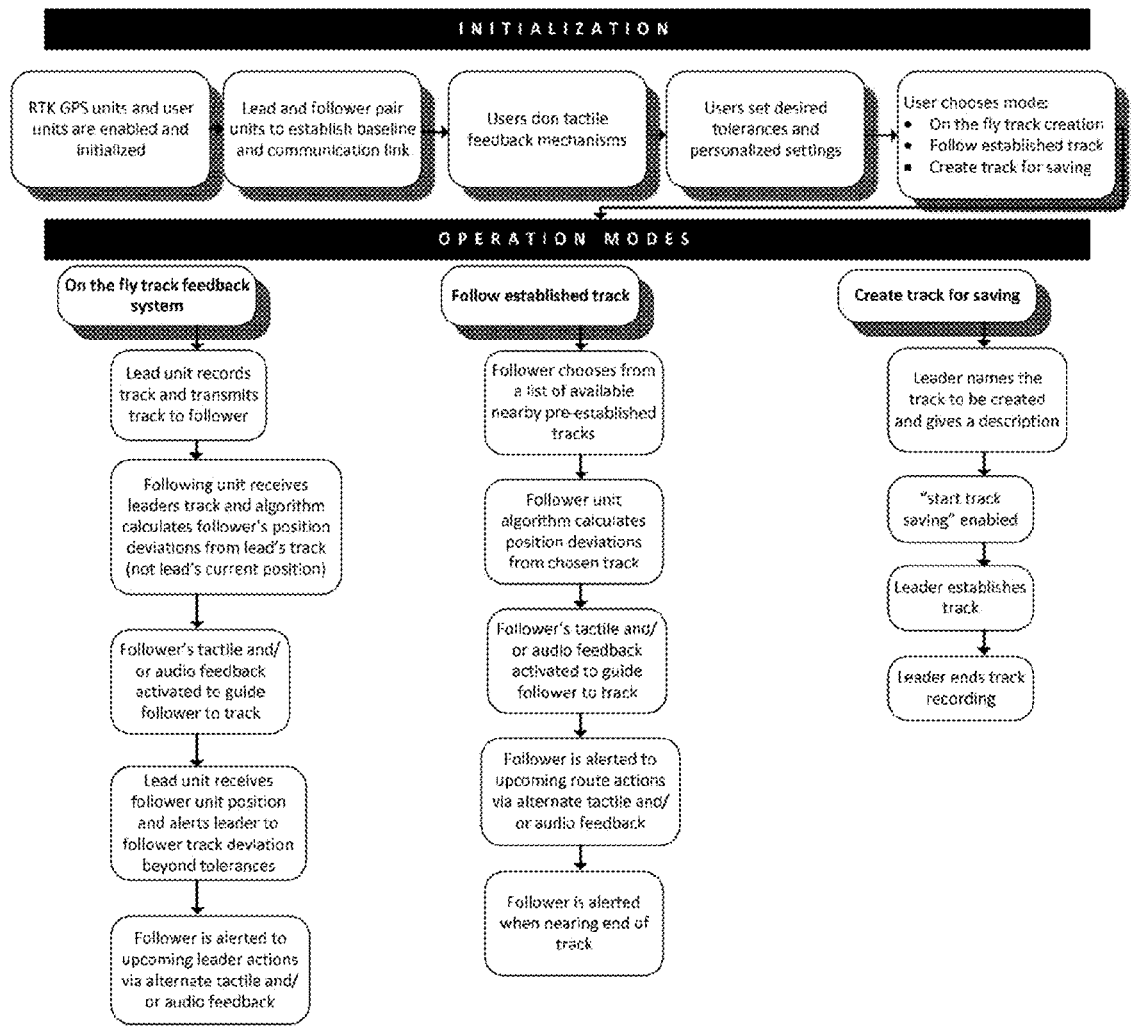
FIG. 2 provides a flowchart for the system in three different operational modes.

FIG. 2 provides a flowchart for the system in three different operational modes described below.

Mode 1—"On the fly" path creation, guidance, following and feedback. In this mode, the mobile leader unit and the mobile follower unit communicate via radio. The leader's accurate (order of centimeters) position and track is communicated to the follower. The follower's position and deviation from the leader's track is then computed via an algorithm on the follower's microcontroller unit.

Feedback of multiple forms including but not limited to tactile, audio and visual cues alert the follower to their deviation from the leader's track. Parameters of the algorithm can be adjusted to the follower's preferences, such as feedback preferences that include how the follower is alerted to correct course, location on the track of the leader in front of the follower where position deviance is calculated, and tolerances, for example, the leader may receive feedback if the position of the follower deviates beyond a desired distance from the leader's track.

Mode 2—Following an established track with feedback. The follower can choose an existing track if one has been established (see Mode 3—Creating a track for saving—below). The feedback and options are the same as in Mode 1, but there is no leader present.

Mode 3—Creating a track for saving. The lead unit can be used on its own to create and save tracks for the follower to use without the lead unit present. The tracks created by the leader are named and given a description for the follower unit to pick from at a later time.

Figure 3:
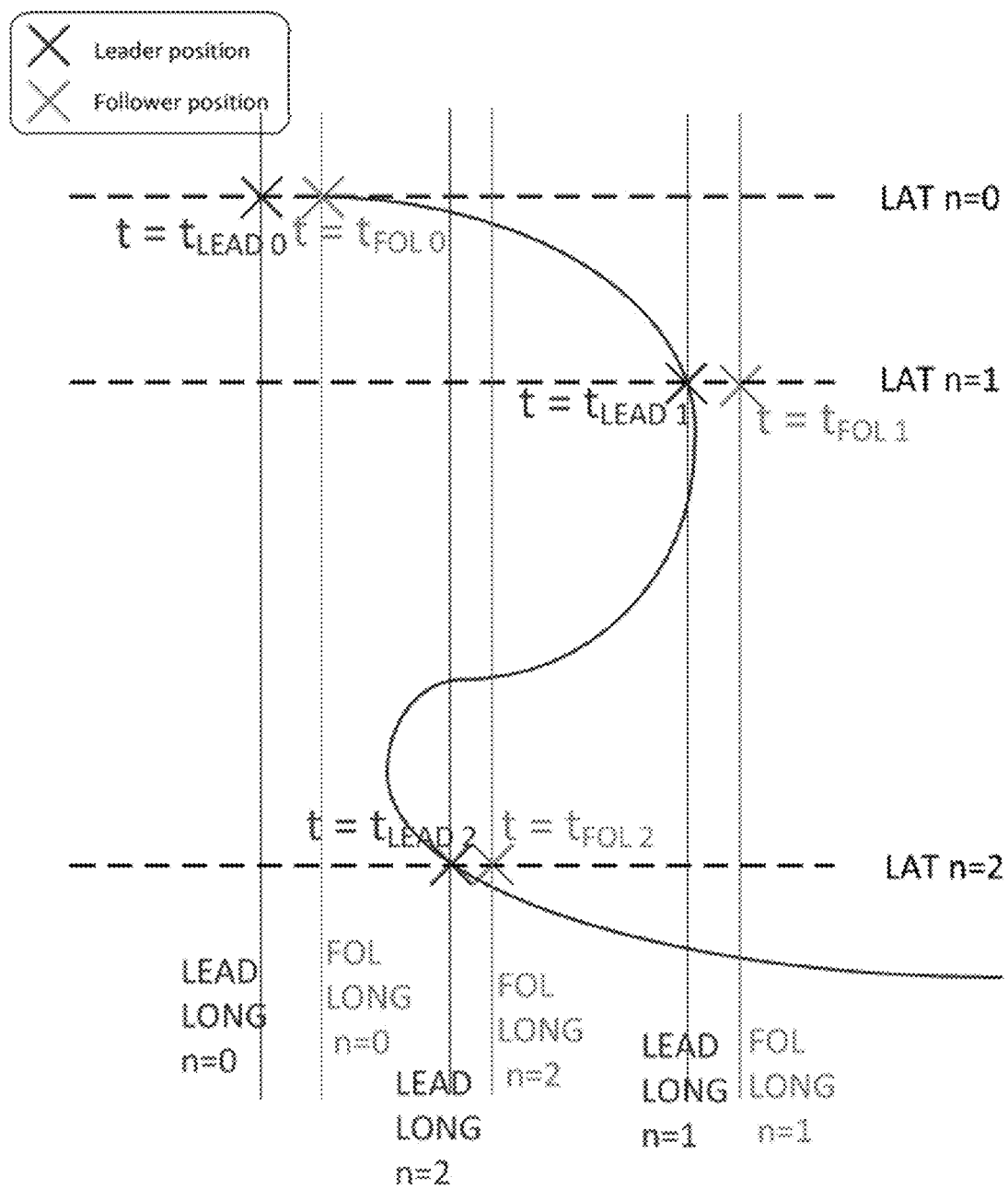
FIG. 3 shows a description of the system computing path deviations.

FIG. 3 shows a description of the system computing path deviations. The follower unit calculates its deviation from the lead unit's path using the algorithm depicted in FIG. 3. The leader's "X" in FIG. 3 is the leader setting the path. The other "X" represents the follower. The leader is ahead of the follower and reaches a position at time $t = t_{LEAD\ n}$.

The follower reaches a position at its local time, $t = t_{FOL\ n}$, and wants to check "when the leader was at this latitude, what was the longitude of the leader?" Thus the equation becomes:

$$(\text{LEAD LONG})_{[when\ leadlat=follat]} - (\text{FOL LONG})_{[current]} = \text{ERROR}.$$

The follower's coding method will be:
1. Get current coordinates (Lat, Long).
2. Get leader's coordinate history (Lat, Long).
3. Look through leader's past and find when leader's longitude was equal to current longitude. Use an approximation factor to prevent errors of never finding an exact match.
4. Perform error calculation as formula above.
5. Output desired action to feedback mechanism.
6. Monitor buffer size for how much leader data is kept and how it is managed.
7. Monitor LAT times and eliminate earlier LATs to prevent problem of multiple LATs that occur when path loops back on previous location An alternative method for finding position differences are:
1. Calculate distance between leader and follower.
2. Based on velocity (calculated or from data) know how far back to look in leader's history using time and look around for matching latitudes.

Figure 4:
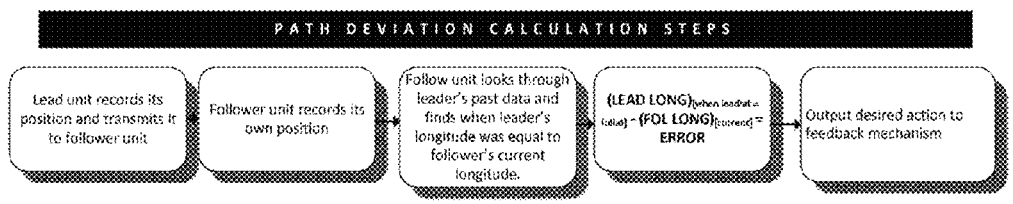
FIG. 4 is a flowchart of the path deviation algorithm.

FIG. 4 is a flowchart of the path deviation algorithm. The follower can also choose to look slightly ahead of their own path to get information on upcoming events in order to plan trajectory changes. This information is relayed to the follower via additional actuators and instruments—vibration motors in additional locations and audible alerts.

Figure 5:
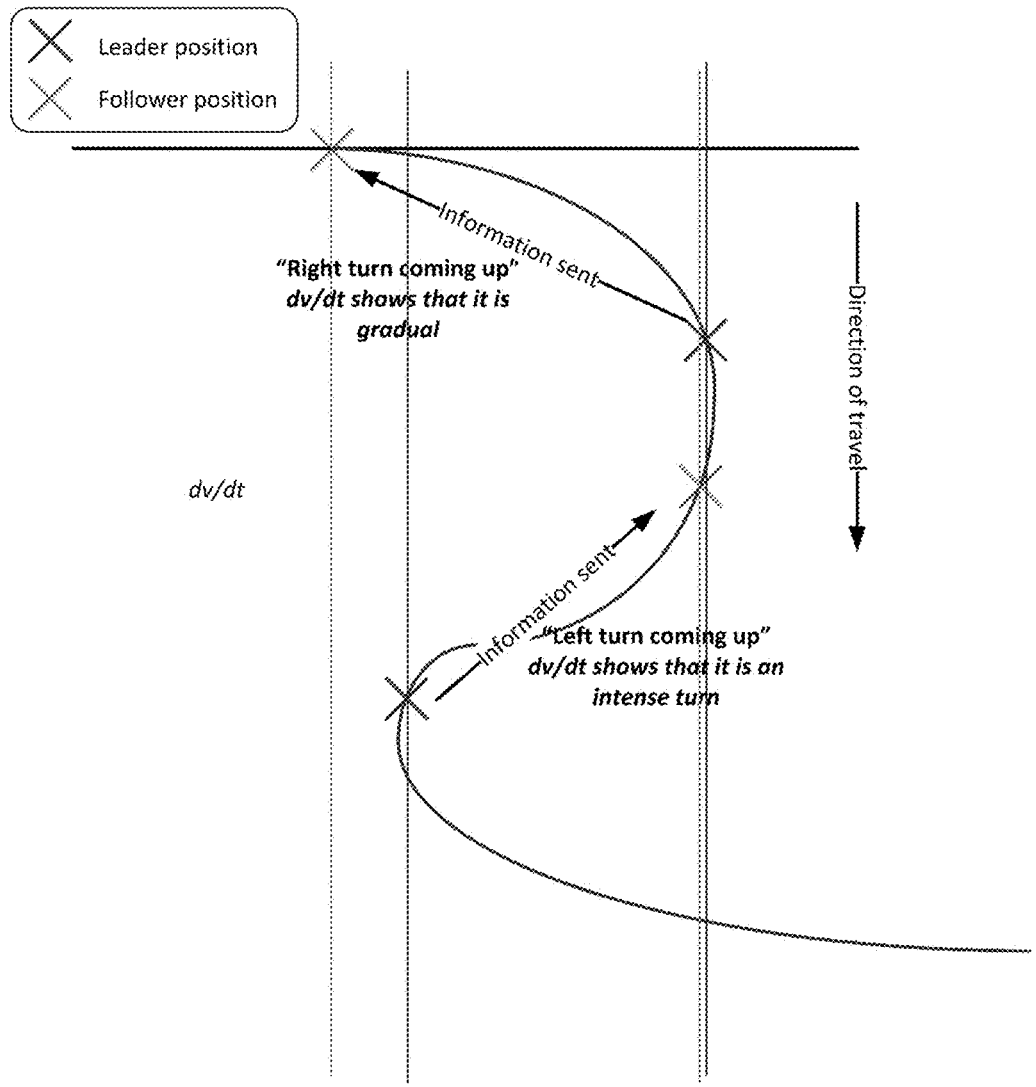
FIG. 5 illustrates the algorithm for trajectory planning.

FIG. 5 illustrates the algorithm for trajectory planning. The leader's first derivative of velocity as a function of time is calculated so that an intensity or acceleration of the direction change can be sent to the follower. Information is transmitted from the leader to the follower on upcoming trajectory changes so that the follower can prepare to change direction. For upcoming direction changes, the follower is alerted using separate feedback actuators different from the path error feedback actuators and alerts to upcoming changes in direction. The follower can customize the system to specify how far ahead of their own path they want to look. The information carries the intensity of the direction change as well. The algorithm computes the derivative of the position and velocity to determine how intense the change of trajectory is. This allows the follower to know how to prepare for the upcoming path.

Figure 6:
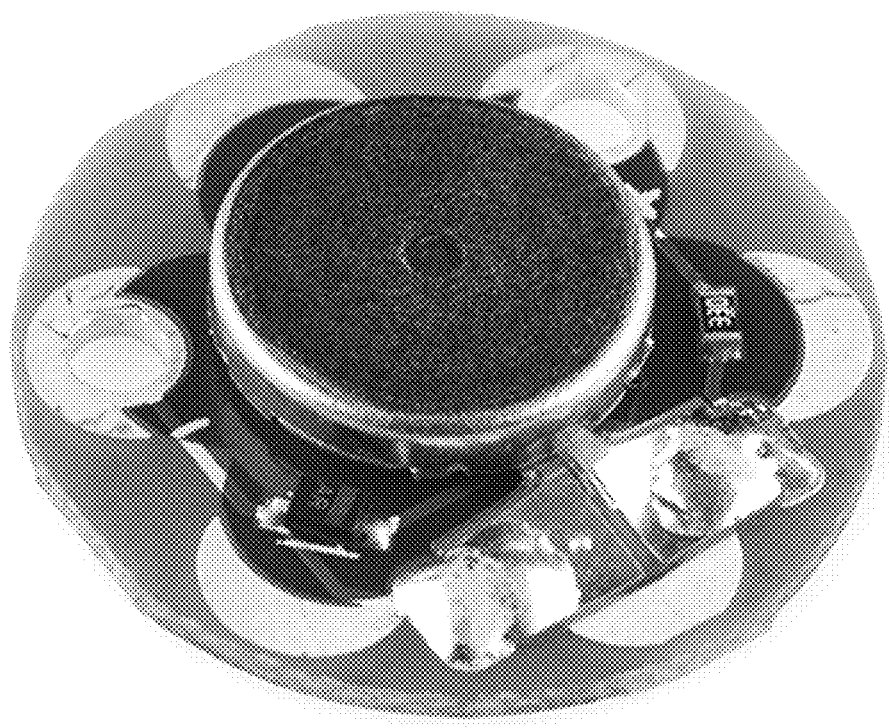
FIG. 6 is a photograph of the LilyPad Vibe Board used for vibration feedback.

Information on path deviances are relayed to the users using various feedback systems. These systems include individually or in combination, but not limited to haptics, audible alerts, and visual cues. In one embodiment, the follower wears a suit with integrated vibration motors in key locations to interpret path corrections needed to follow the leader path. The vibration motors would be integrated into a wearable garment to be easily donned and doffed by the user. FIG. 6 shows a photograph of one such commercially available vibration actuator that could be used in said suit.

Figure 7:
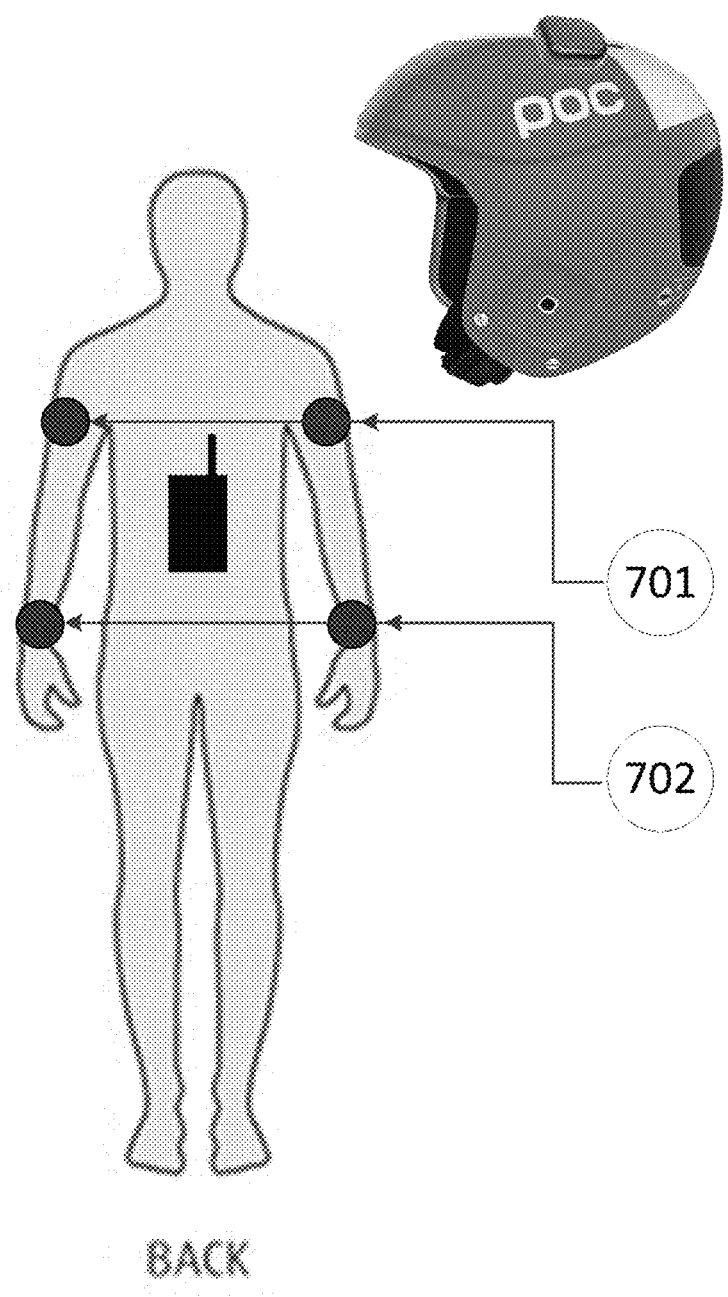
FIG. 7 shows on an anthropomorphic representation, possible locations for tactile feedback actuators.
Figure 8:
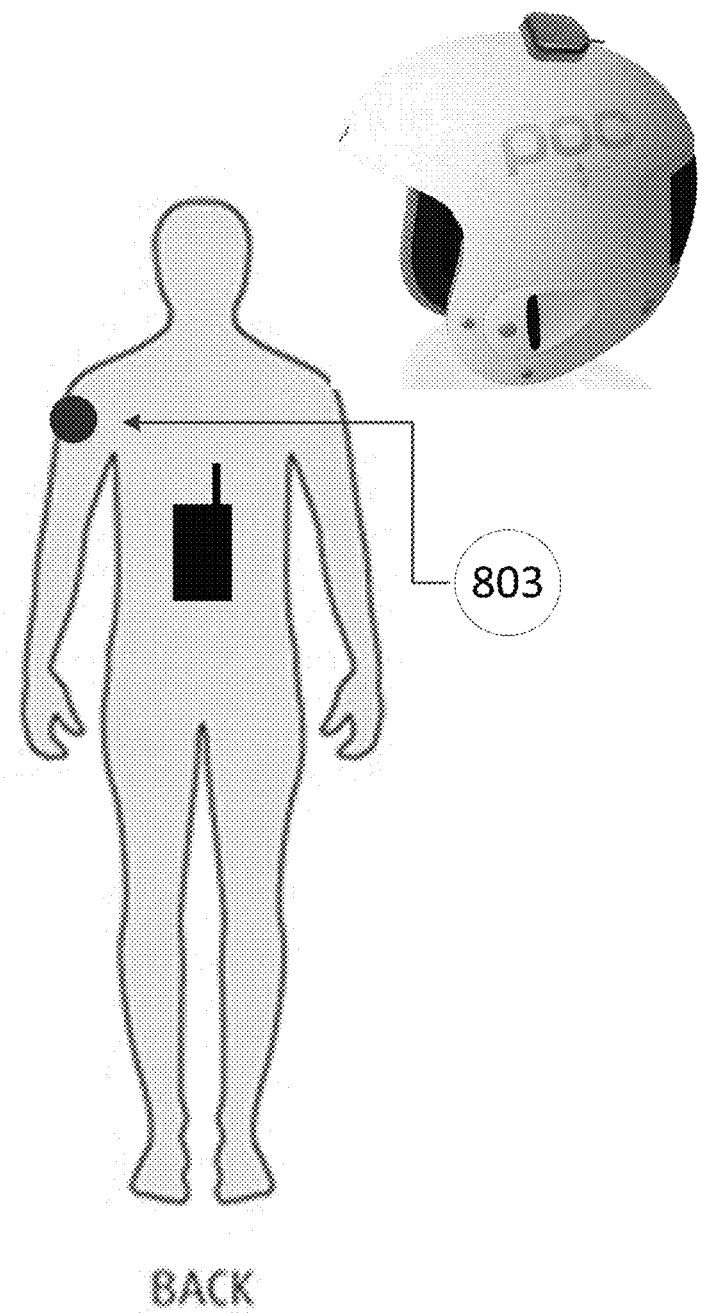
FIG. 8 illustrates the leader feedback mechanism.
Figure 9:
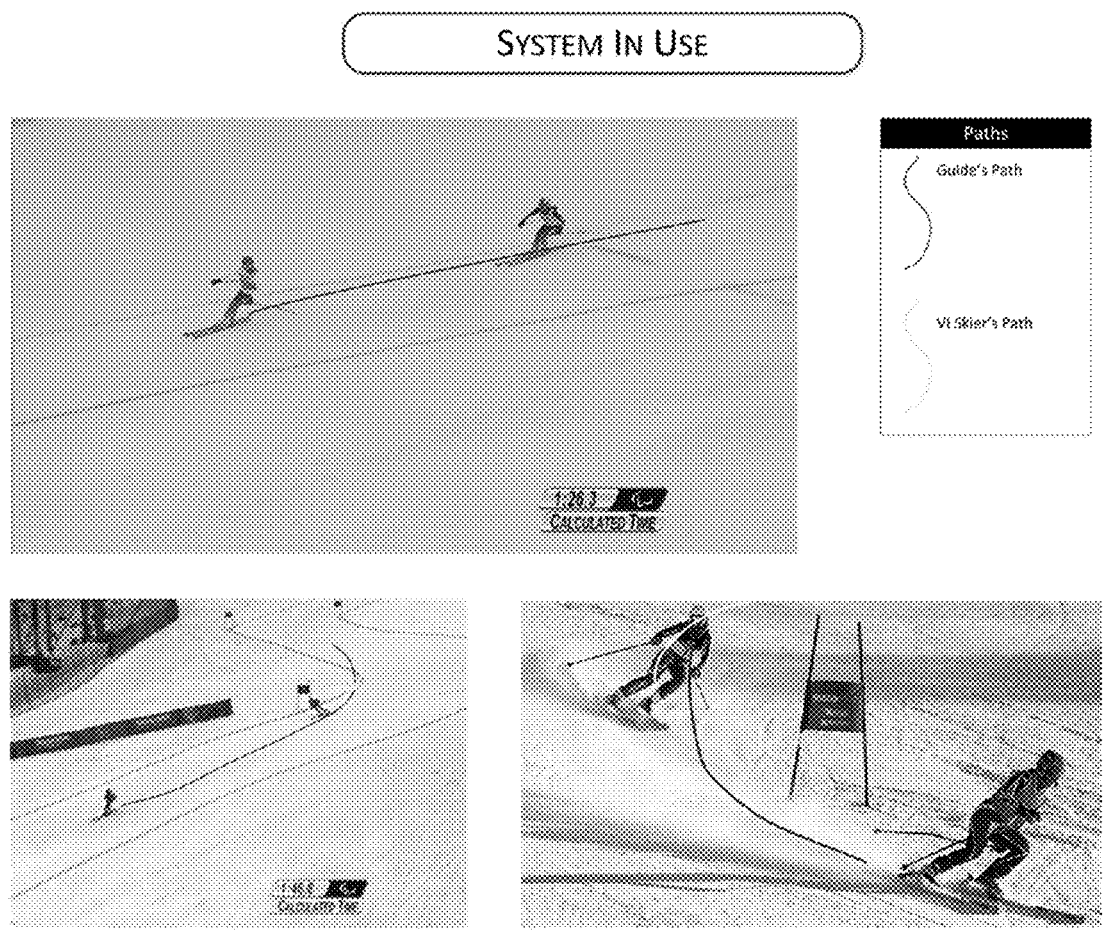
FIG. 9 illustrates one embodiment of the invention to be used by visually impaired competition skiers.

The leader's unit receives the follower's position and in one embodiment calculates if the follower has deviated from the leader's track beyond a specified parameter. If so, the leader is alerted via tactile, audible, or visual feedback. FIG. 7 shows on an anthropomorphic representation possible locations for tactile feedback actuators. Detail 701 in FIG. 7 shows an actuator on the upper arm where a vibration alerts a skier if they deviate from the guide's path. Detail 702 in FIG. 7 shows an actuator on the lower arm where a vibration indicates to a skier upcoming turns based on the guide's position. FIG. 8 illustrates the leader feedback mechanism and detail 803 in FIG. 8 shows a location for a vibration alert to the guide if the skier deviates from a path too much or is too far behind.

Figure 10:
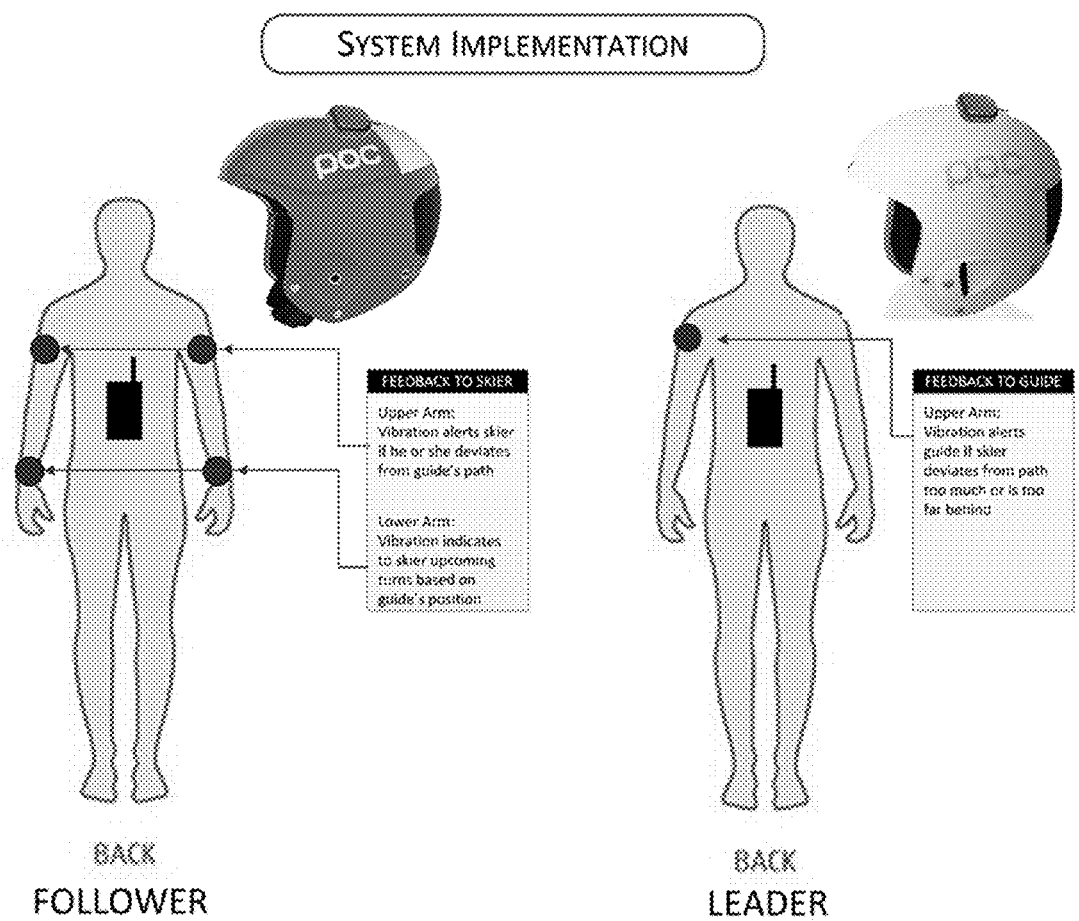
FIG. 10 shows components for one embodiment of the system for a visually impaired competition skiing guidance system.

FIG. 10 shows components for one embodiment of the system for a visually impaired competition skiing guidance system. In visually impaired skiing competition, a sighted guide skier skis ahead of a Visually Impaired (VI) skier. The VI skier attempts to follow their guide down a gated ski course at a high rate of speed. The skiing team of sighted and VI skier with the shortest time on the course wins the competition. If a gate is missed, the team is disqualified.

Currently, the sighted guide and the VI skier communicate either by voice, audible signals such as ski pole taps, or communication devices such as Bluetooth headsets. This new guidance system could be used to enhance communication between the guide and the VI skier and improve race course performance.

FIG. 10 shows how the lead (sighted) skier sets a virtual path and the follower VI skier's device can detect that path and alert him or her to deviations from that path using tactile or audio feedback. The follower also can configure the system to provide information about upcoming events such as turns or elevation changes via additional encoded feedback. The leader is alerted when the VI skier deviates too far from the desired path trajectory. This allows the leader to focus on skiing the fastest trajectory in the race course by alleviating the need to be constantly looking back to check on the follower's position.

Figure 11:
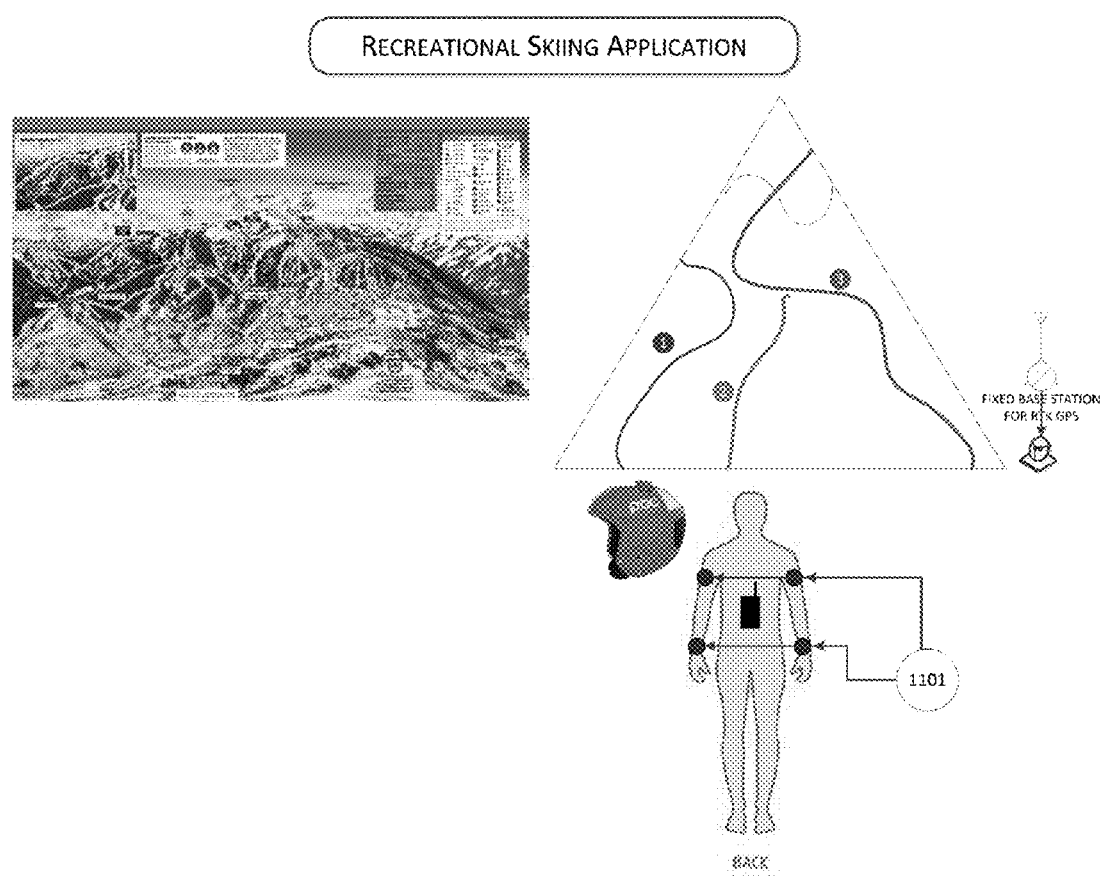
FIG. 11 shows components of the system in another embodiment for a visually impaired recreational skiing guidance system.

FIG. 11 shows components of the system in another embodiment for a visually impaired recreational skiing guidance system. The guidance system could also be used for recreational skiing at commercial ski resorts to enable a much greater level of independence and enjoyment for visually impaired skiers.

Visually impaired (VI) skiers usually ski with a sighted guide in front, behind, or beside them. The pair communicates using voice, audible signals, or radio communications. The sighted guide gives the VI skier information on where to go, obstacles to avoid, and other skiers in the area. Tracks can be established using this embodiment of the invention and recorded by sighted skiers in advance, in areas designated for VI skiing. The VI skier can then go to that location and use the guidance device to follow that track with feedback and minimal or no intervention by a sighted guide.

Detail 1101 in FIG. 11 show the location of actuators to provide feedback to the user of current path deviations and upcoming turns based on the set path.

The device is implemented in the following manner.

1. Base station is installed at the mountain for precise RTK GPS positioning. Only one mobile unit is required.
2. A sighted skier, wearing one unit, establishes fixed tracks on the mountain and paths are recorded.
3. VI skiers wear unit and choose the desired track via an audio interface.
4. A tactile or audible feedback system, similar to the above mentioned race system, helps guide the VI skier.
5. VI skiers can now lead the way with less input from the guide following behind. Only the VI skier needs to wear the unit.

Figure 12:
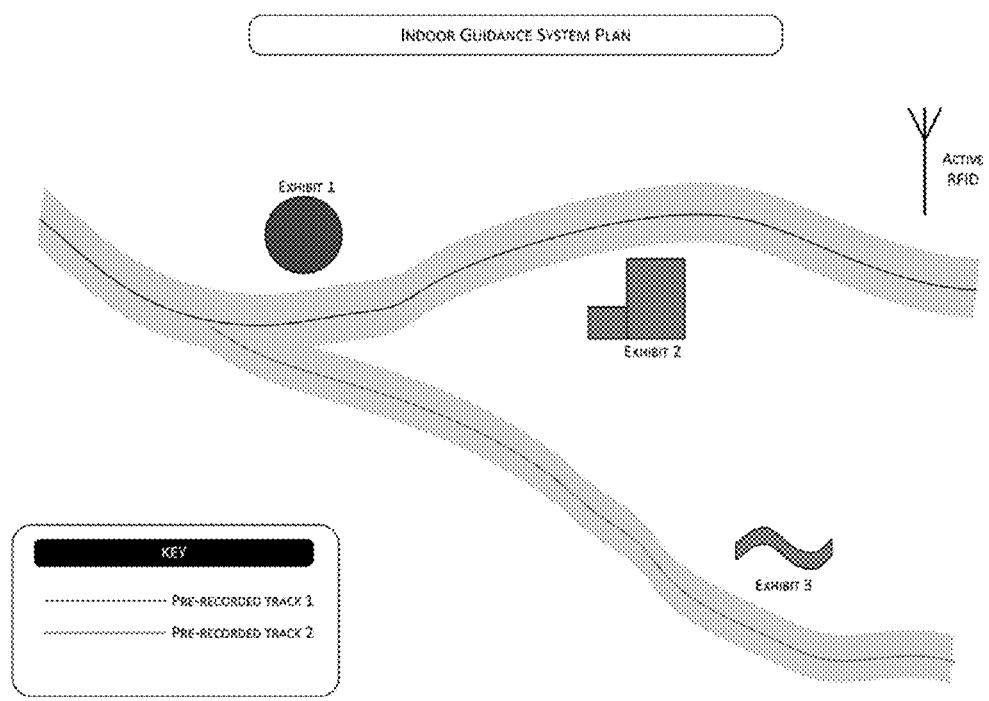
FIG. 12 illustrates another embodiment of the invention used for an indoor guidance system for path following.

In another embodiment of the invention, the guidance system can be used as a navigation system through a museum or other indoor exhibits as illustrated in FIG. 12.

Figure 13:
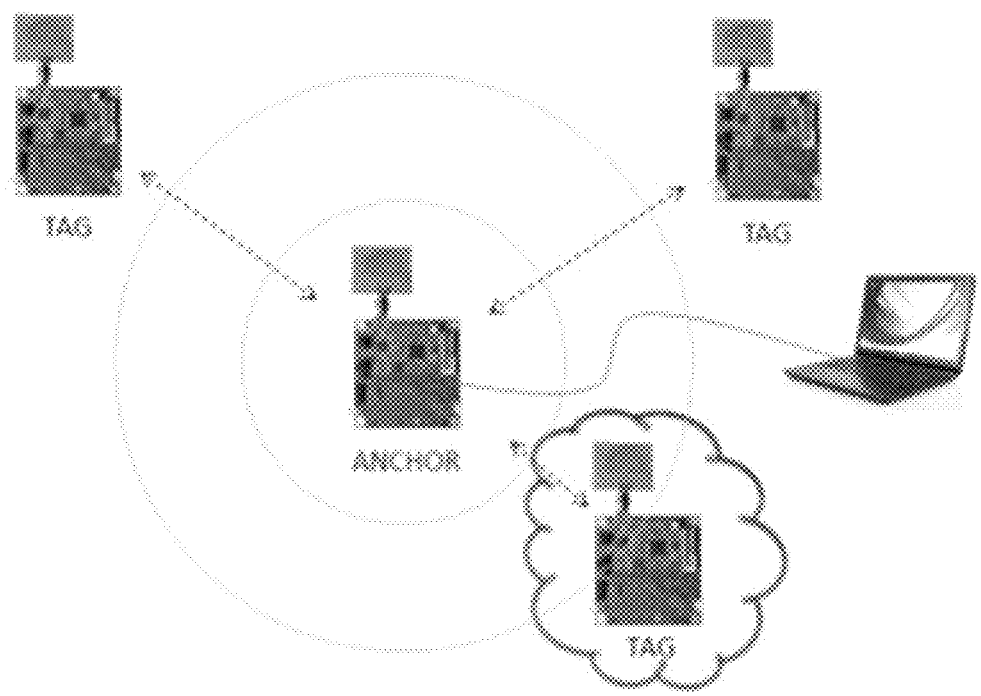
FIG. 13 is a schematic of the DecaWave TREK1000 UWB position tracking system.

The feedback system, which can include but is not limited to haptic, audible alerts, or visual cues, can be used indoors using a different implementation of position location. Method one uses an active Radio Frequency Identification (RFID) trilateration system. Method 2 uses an Ultra Wide Band (UWB system) such as the commercially available DecaWave Two-Way-Ranging (TWR) Real Time Location Systems (RTLS) shown in FIG. 13. Other methods include Infrared Positioning and Ultrasonic Positioning.

As in the recreational skiing system implementation illustrated in FIG. 11 and discussed above, different paths are pre-established. The visual impaired guest then picks one of these paths to visit the exhibits and sites he or she desires. The user's location is found using active RFID and tactile and audible feedback guides him or her along the path.

Figure 14:
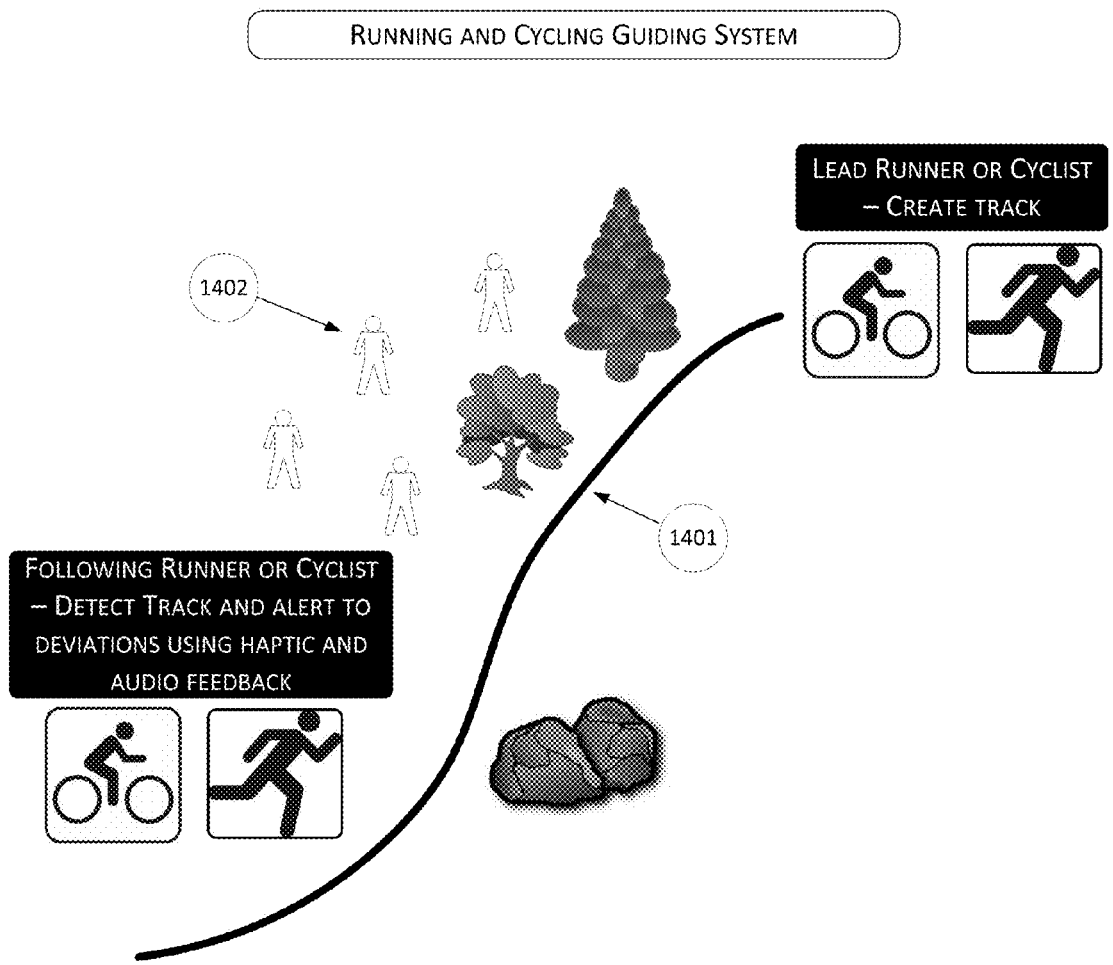
FIG. 14 illustrates another embodiment of the invention for running and cycling guidance.

FIG. 14 illustrates another embodiment of the invention for running and cycling guidance. In this embodiment the system can be used to guide a person with a visual impairment while running or cycling, whether in a competitive event or recreationally. Detail 1401 in FIG. 14 is the high accuracy (order of centimeters) track that is established. The track is set and read at a high frequency (e.g., 10-50 Hz). Detail 1402 in FIG. 14 are obstacles and bystanders that can be avoided due to the set track.

What is claimed is:

1. A method for path guidance comprising:
   (i) an "initialization phase" comprising:
      a step designating at least one person as a "leader" and designating at least one person as a "follower;"
      a step where said leader dons a "leader unit" and said follower dons a "follower unit;"
      a step where said leader unit and said follower unit is enabled to communicate and communication links between said leader units and said follower units are established;
      a step where said leader units and said follower units are further enabled to record position coordinates corresponding to said leader and said follower location and establish a baseline location comprised of initial position coordinates of said leader and initial position coordinates of said follower;
      a step where said leader and said follower each don feedback alert systems;
      wherein said leader feedback alert systems are enabled with leader feedback actuators, and follower feedback alert systems are enabled with follower feedback actuators;
      wherein said leader feedback alert systems communicate with said leader units and said follower feedback alert systems communicate with said follower units;
      wherein said leader feedback alert systems could initiate feedback actuators when signaled by said leader unit and said follower feedback alert systems can initiate feedback actuators when signaled by said follower unit;
   (ii) a "path deviation calculation phase" comprising:
      a step where said leader unit records leader unit position coordinates and transmits said leader unit position coordinates to said follower unit;
      a step where said follower unit records said follower position coordinates and said follower unit calculates deviations between said leader position coordinates and said follower position coordinates; and,
   (iii) an "alert phase" where information is transmitted from said leader unit to said follower unit on upcoming trajectory changes and where said follower is alerted using said feedback actuators to upcoming changes in direction.

2. The method of claim 1 further comprising:
   a path deviation calculation phase comprising the steps of:
      recording and storing leader unit position coordinates as a prescribed path prior to non-contemporaneous use by a follower;
      transmitting previously stored position coordinates on said leader unit for said prescribed path to a follower unit;
      recording said follower unit position coordinates;
      calculating deviations between stored leader position coordinate histories and follower position coordinates.

3. The method of claim 1 further comprising:
   a path deviation calculation phase comprising the steps of:
      recording and storing leader unit position coordinates;
      transmitting said leader unit position coordinates to follower units;
      recording said follower unit position coordinates;
      calculating deviations between said leader unit position coordinates and contemporaneous follower unit coordinates;
      wherein said calculated deviations between said leader unit position coordinates and contemporaneous follower unit coordinates are accomplished with less than 1 second latency and where said leader unit coordinates are available in near real-time with less than 1 second latency.

4. The method of claim 1 further comprising:
   a path deviation calculation phase comprising the steps of:
      recording and storing leader unit position coordinates as a prescribed path prior to non-contemporaneous use by a follower;
      transmitting previously stored position coordinates on said leader unit for said prescribed path to a follower unit;
      recording said follower unit position coordinates;
      calculating deviations between stored leader position coordinate histories and follower position coordinates;
      wherein said calculated deviations between said leader unit position coordinates and follower unit coordinates are accomplished with less than 1 second latency and where said leader unit coordinates are available in near real-time with less than 1 second latency.

5. The method of claim 1 further comprising:
a step where the derivative of spatial coordinates and velocity are calculated for a leader and follower to determine the intensity of follower directional changes.

6. The method of claim 1 further comprising:
a step where haptic feedback actuators on the follower are employed to alert the follower to effect upcoming path changes.

7. The method of claim 1 further comprising:
a step where audio alerts are actuated on the follower to alert the follower to effect upcoming path changes.

8. The method of claim 1 further comprising:
a step where haptic feedback actuators on the leader are employed to alert the leader of follower deviations from a path prescribed by the leader.

9. The method of claim 1 further comprising:
a step where audio alerts on the leader are employed to alert the leader of follower deviations from stored position coordinates.

10. A method for path guidance comprising:
(i) an "initialization phase" comprising:
   a step designating at least one person as a "follower;"
   a step where said follower dons a "follower unit,"
   a step where said follower units are enabled to communicate with one or more leader units;
   a step where communication links between said leader units and said follower units are established;
   a step where said follower units are enabled to record position coordinates corresponding to said follower location;
   a step where an initial baseline location comprised of initial position coordinates of said follower units relative to non-contemporaneously recorded leader unit position coordinate histories is established;
   wherein recorded leader position coordinate histories are stored as prescribed paths in said leader unit;
   a step where said follower unit records its position and the follower unit calculates deviations between non-contemporaneously recorded leader position coordinate histories stored as prescribed paths and follower position coordinates;
   a step where said followers don feedback alert systems;
   wherein follower feedback alert systems are enabled with feedback actuators;
   wherein said follower feedback alert systems communicate with said follower units;
   wherein said follower feedback alert systems can initiate feedback actuators when signaled by said follower unit;
(ii) a "path deviation calculation phase" comprising:
   a step where said leader unit transmits said leader position coordinates to said follower unit;
   a step where said follower unit records said follower position coordinates and said follower unit calculates deviations between said leader position coordinates and said follower position coordinates; and,
(iii) an "alert phase" where information is transmitted from said leader unit to said follower unit on upcoming trajectory changes and where said follower is alerted using said feedback actuators to upcoming changes in direction.

11. The method of claim 10 further comprising:
a step where the derivative of spatial coordinates and velocity are calculated for a leader unit and a follower unit to determine the intensity of follower directional changes.

12. The method of claim 10 further comprising:
a path deviation calculation comprising:
   a step where position coordinate histories of a prescribed path stored by a leader unit is transmitted to a follower unit;
   a step where said follower unit records its position and calculates deviations between leader coordinates and follower coordinates with less than 1-second latency and where said follower coordinates and follower coordinate deviations from stored leader coordinate histories are determined in near real-time with less than 1-second latency.

13. The method of claim 10 further comprising:
a step where haptic feedback actuators on the follower are employed to alert the follower to effect upcoming path changes.

14. The method of claim 10 further comprising:
a step where audio alerts are actuated on the follower to alert the follower to effect upcoming path changes.

* * * * *